United States Patent
Fagnani et al.

(10) Patent No.: US 12,401,277 B2
(45) Date of Patent: Aug. 26, 2025

(54) INPUT VOLTAGE FEEDFORWARD IN CONSTANT AMPLITUDE RAMP

(71) Applicant: TEXAS INSTRUMENTS INCORPORATED, Dallas, TX (US)

(72) Inventors: Anthony Fagnani, Allen, TX (US); Bradley Zarek, Manchester, NH (US); Saurav Bandyopadhyay, Dallas, TX (US); Jianbo Gou, Spring Valley, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 180 days.

(21) Appl. No.: 18/168,948

(22) Filed: Feb. 14, 2023

(65) Prior Publication Data
US 2024/0146191 A1    May 2, 2024

Related U.S. Application Data

(60) Provisional application No. 63/421,807, filed on Nov. 2, 2022.

(51) Int. Cl.
*H02M 3/158* (2006.01)
*H02M 1/00* (2006.01)

(52) U.S. Cl.
CPC ......... *H02M 3/158* (2013.01); *H02M 1/0022* (2021.05); *H02M 1/0025* (2021.05)

(58) Field of Classification Search
CPC ... H02M 3/158; H02M 1/0022; H02M 1/0025
See application file for complete search history.

(56) References Cited

U.S. PATENT DOCUMENTS

| | | | |
|---|---|---|---|
| 5,659,587 A * | 8/1997 | Knierim | H03B 23/00 380/34 |
| 9,270,176 B1 * | 2/2016 | Nguyen | H02M 3/156 |
| 9,317,049 B2 * | 4/2016 | Guo | G05F 1/46 |
| 9,887,626 B2 * | 2/2018 | Chen | H02M 1/08 |
| 10,063,143 B1 * | 8/2018 | Fan | H02M 5/458 |
| 11,552,624 B1 | 1/2023 | Kazama et al. | |
| 2014/0361755 A1 | 12/2014 | Tateishi | |
| 2016/0309106 A1 | 10/2016 | Zuo | |
| 2018/0248479 A1 | 8/2018 | Fan | |
| 2020/0212800 A1 | 7/2020 | Fan | |
| 2021/0376730 A1 * | 12/2021 | Yan | H02M 3/1584 |
| 2022/0200453 A1 * | 6/2022 | Mednik | H02M 1/0025 |

(Continued)

OTHER PUBLICATIONS

International Search Report dated Mar. 7, 2024.

(Continued)

*Primary Examiner* — Rafael O De Leon Domenech
(74) *Attorney, Agent, or Firm* — Charles F. Koch; Frank D. Cimino

(57) ABSTRACT

In some examples, an apparatus includes a constant amplitude ramp generator having a differential output and first and second generator inputs, in which the first generator input is coupled to a power terminal. The apparatus also includes an input voltage feed-forward circuit having a feed-forward input and a feed-forward output, in which the feed-forward input is coupled to an input voltage terminal, and the feed-forward output is coupled to the second generator input.

20 Claims, 5 Drawing Sheets

(56) References Cited

U.S. PATENT DOCUMENTS

2022/0224230 A1* 7/2022 Chakkirala ........... H02M 3/158

OTHER PUBLICATIONS

Kavci, Mustafa et al: "Total Harmonic Distortion and Power Factor Improvement Technique for CRM Flyback PFC Converters", 2019 IEEE 62nd International Midwest Symposium on Circuits and Systems (MWSCAS), IEEE, Aug. 4, 2019 (Aug. 4, 2019), pp. 399-402, XP033653076, DOI: 10.1109/MWSCAS.2019.8885187.

* cited by examiner

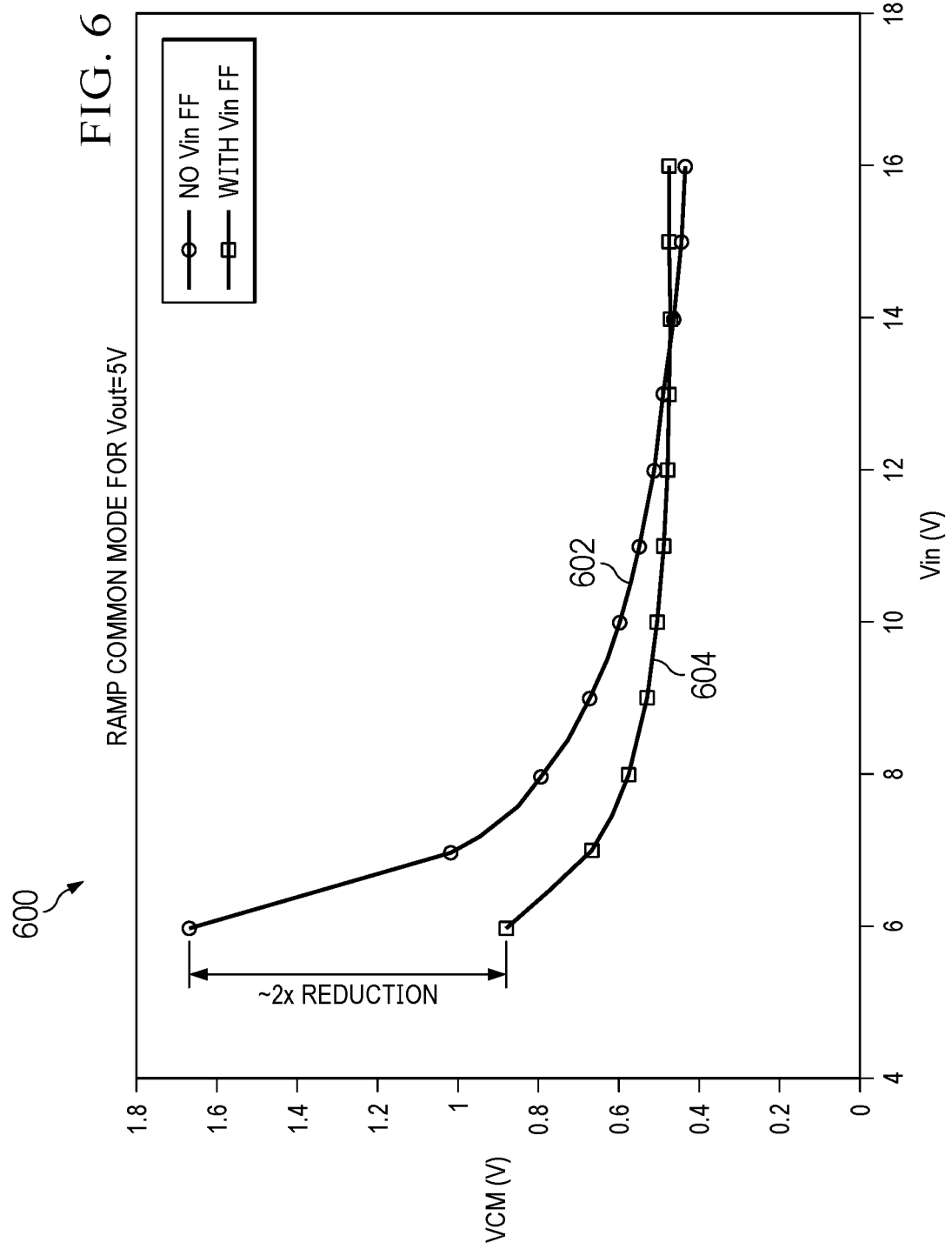

INPUT VOLTAGE FEEDFORWARD IN CONSTANT AMPLITUDE RAMP

CROSS-REFERENCE TO RELATED APPLICATIONS

The present application claims priority to U.S. Provisional Patent Application No. 63/421,807, which was filed Nov. 2, 2022, and is hereby incorporated herein by reference in its entirety.

BACKGROUND

Some electronic devices include a power converter to convert an input voltage provided by a voltage source from a first value to an output voltage at a second value. The second value may be greater than or less than the first value, based on an architecture of the power converter (e.g., buck, boost, buck-boost, etc.). The process of providing the output voltage based on the input voltage may be referred to as voltage regulation. Various strategies for voltage regulation exist, such as including feedback that monitors the second value and controlling operation of the power converter based on a relationship of the second value to a target value.

SUMMARY

In some examples, an apparatus includes a constant amplitude ramp generator having a differential output and first and second generator inputs, in which the first generator input is coupled to a power terminal. The apparatus also includes an input voltage feed-forward circuit having a feed-forward input and a feed-forward output, in which the feed-forward input is coupled to an input voltage terminal, and the feed-forward output is coupled to the second generator input.

In some examples, an apparatus includes a voltage divider having a divider output, in which the voltage divider is coupled between an input voltage terminal and a ground terminal. The apparatus also includes a first transistor having a first control terminal, a source, and a drain, in which the first control terminal is coupled to the divider output, and the drain is coupled to a voltage supply terminal. The apparatus also includes a current source coupled between the source and the ground terminal. The apparatus also includes a buffer having a buffer input and a buffer output, the buffer input coupled to a signal input terminal. The apparatus also includes a second transistor having a second control terminal. The apparatus also includes a first capacitor coupled between the buffer output and the second transistor, in which the second transistor is coupled between the first capacitor and the source. The apparatus also includes a third transistor having a third control terminal, in which the third transistor is coupled between the first capacitor and a first output terminal, and the third control terminal is coupled to the signal input terminal. The apparatus also includes a fourth transistor having a fourth control terminal. The apparatus also includes an inverter having an inverter input and an inverter output, the inverter input coupled to the signal input terminal, and the inverter output coupled to the second and fourth control terminals. The apparatus also includes a resistor coupled between the ground terminal and the fourth transistor, in which the fourth transistor is coupled between the first output terminal and the resistor. The apparatus also includes a second capacitor coupled between the first output terminal and the ground terminal. The apparatus also includes a filter coupled between the first output terminal and a second output terminal.

In some examples, a system includes a power converter including a switch terminal and a control terminal, the power converter configured to switch a signal from an input voltage terminal to an output voltage terminal. The system also includes a controller coupled to the power converter, the controller configured to control the power converter to switch the signal from the input voltage terminal to the output voltage terminal. The controller includes a ramp generator having a first and second generator inputs and a differential output, in which the first generator input is coupled to the switch terminal. The controller also includes an input voltage feed-forward circuit having a feed-forward input and a feed-forward output, in which the feed-forward input is coupled to the input voltage terminal, and the feed-forward output is coupled to the second generator input. The controller also includes control logic coupled to the differential output and the control terminal, the control logic configured to determine a value of a control signal for controlling the power converter based on a differential signal provided at the differential output.

BRIEF DESCRIPTION OF THE DRAWINGS

FIG. 6 is a diagram of signals, in accordance with various examples.

DETAILED DESCRIPTION

As described above, a power converter converts an input voltage (VIN) provided by a voltage source from a first value to an output voltage (VOUT) at a second value. The second value may be greater than or less than the first value, based on an architecture of the power converter (e.g., buck, boost, buck-boost, etc.). The process of providing VOUT based on VIN may be referred to as voltage regulation. Various strategies for voltage regulation exist, such as including feedback that monitors the second value and controlling operation of the power converter based on a relationship of the second value to a target value. Some voltage regulation strategies include determination and providing of a ramp signal or ramp signals that emulate an inductor current of the power converter. In some examples, the ramp signals are constant amplitude ramp signals. Such ramps may be useful in, for example, constant on time (COT) control of the power converter. Various challenges may exist in the determining and providing of constant amplitude ramp signals, such as in high duty cycle applications of the power converter. In some examples, a high duty cycle application is an application in which the duty cycle is greater than about 30 percent. One such challenge is the formation of a ramp common mode voltage having a value sufficiently large that insufficient headroom exists between the common mode voltage and a supply voltage of at least some components of the power converter, or control circuitry for the power converter.

Examples of this description include a constant amplitude ramp generator having an input voltage feed-forward circuit. The input voltage feed-forward circuit provides a signal to the constant amplitude ramp generator having a relationship to VIN. In this way, a ramp signal provided by the ramp generator may include variation with respect to a value of VIN while remaining constant for a given value of VOUT. For example, as VIN decreases in value, the amplitude of the ramp signal also decreases in value. Conversely, as VIN increases in value, the amplitude of the ramp signal increases in value. In this way, the amplitude of the ramp signal may be decreased in high duty cycle applications of the power converter, correspondingly reducing the ramp common mode voltage in these high duty cycle applications.

Figure 1:
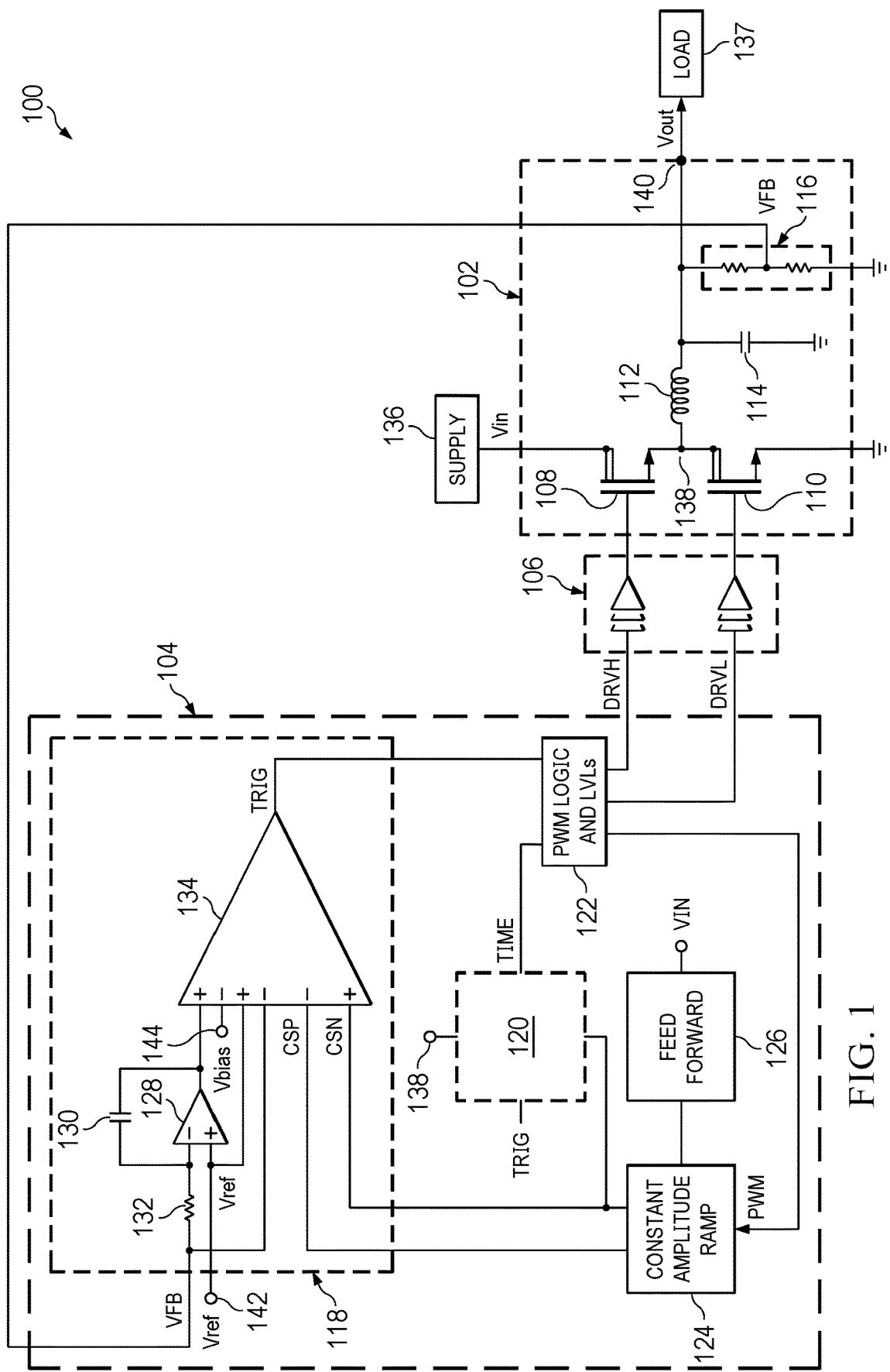
FIG. 1 is a block diagram of a system, in accordance with various examples.

FIG. 1 is a block diagram of a system 100, in accordance with various examples. The system 100 includes a power converter 102, a controller 104, and a driver 106. As shown in FIG. 1, the system 100 represents a single-phase regulator. However, it may also be representative of one phase of a multiphase regulator. In an example, the power converter 102 includes transistors 108, 110. In an example, the power converter 102 also includes an inductor 112 and a capacitor 114, which each may be coupled to the power converter 102 or co-located on a same semiconductor die as the power converter 102. The power converter 102 also includes a feedback circuit 116, which in some examples, includes a voltage divider. The controller 104 includes a loop control circuit 118, an on-time timer circuit 120, pulse width modulation (PWM) logic 122, a constant amplitude ramp generator 124, and an input voltage feed-forward circuit 126. The loop control circuit 118 includes an amplifier 128, a capacitor 130, and a resistor 132 that together form an integrator circuit, and a summing comparator 134.

In an example architecture of the system 100, the transistor 108 has a drain coupled to a voltage supply 136 to receive VIN, a source coupled to a node 138, and a gate. In an example, the node 138 may be referred to as a switch node of the power converter 102. The transistor 110 has a drain coupled to the node 138, a source coupled to a ground terminal, and a gate. The inductor is coupled between the node 138 and a terminal 140. In an example, the terminal 140 is an output terminal of the power converter 102 and system 100, such that VOUT is provided at the terminal 140. The capacitor 114 is coupled between the terminal 140 and the ground terminal. The feedback circuit 116 is coupled between the terminal 140 and the ground terminal, and has an output coupled to the controller 104.

The resistor 132 is coupled between the output of the feedback circuit 116 and a first input (e.g., inverting input) of the amplifier 128. The capacitor 130 is coupled between an output of the amplifier 128 and the first input of the amplifier 128. The amplifier 128 has a second input (e.g., a non-inverting input) coupled to a reference terminal 142. The summing comparator 134 has a first non-inverting input coupled to the output of the amplifier 128, a first inverting input coupled to a bias terminal 144, a second non-inverting input coupled to the reference terminal 142, a second inverting input coupled to the output of the feedback circuit 116, a third non-inverting input coupled to a first output of the constant amplitude ramp generator 124, and a third inverting input coupled to a second output of the constant amplitude ramp generator 124, and an output. The on-time timer circuit 120 has any suitable architecture for implementing on-time control of a power converter, and in an example includes a first input coupled to the node 138, a second input coupled the output of the summing comparator 134, and an output. In an example, the PWM logic 122 has any suitable architecture for providing PWM signals based on received input signals, and includes a first input coupled to the output of the on-time timer circuit 120, a second input coupled to the output of the summing comparator 134, first and second outputs coupled to the driver 106, and a third output. The constant amplitude ramp generator 124 has a first input coupled to the third output of the PWM logic 122, and a second input. The input voltage feed-forward circuit has an input coupled to the voltage supply 136 to receive VIN, and an output coupled to the second input of the constant amplitude ramp generator 124.

In an example of operation of the system 100, the controller 104 controls the driver 106 to drive the power converter 102 to provide VOUT based on VIN. In an example, the controller implements the control based on a value of VIN, a value of a feedback voltage (VFB) provided by the feedback circuit 116, and a target reference voltage (VREF) indicative of a target value for VOUT. As shown in FIG. 1, the power converter 102 has a buck architecture such that VOUT has a value less than a value of VIN. As such, the power converter 102 may operate in two states. In a first state, the transistor 108 is turned on, the transistor 110 is turned off, and the inductor 112 charges. In a second state, the transistor 108 is turned off, the transistor 110 is turned on, and the inductor 112 discharges to the terminal 140 to provide VOUT. To regulate the value of VOUT, the controller 104 controls the power converter 102 to control the timing of the first and second states. As used herein, the controller 104 controlling the power converter 102 may include the controller 104 providing a signal or signals to the driver 106, which provides a drive signal or signals to the power converter 102 to drive the transistor 108 and/or the transistor 110 to turn the transistor 108 and/or the transistor 110 on or off. For example, as current drawn by a load 137 coupled to the terminal 140 increases, VOUT may tend to decrease in value. Information of this decrease in value may be provided to the controller 104 by the feedback circuit 116 in the form of VFB, which may be a scaled representation of VOUT. The controller 104 may accordingly control the power converter 102 to adjust timing of the first and second states to mitigate the decrease in value of VOUT. For example, a duration of the first state time may be increased.

In the example of FIG. 1, the PWM logic 122 provides switch control signals (e.g., drive-high (DRVH) and drive-low (DRVL)) to the driver 106 to control the transistor 108 and the transistor 110. The PWM logic 122 also provides a PWM signal to the constant amplitude ramp generator 124. In an example, PWM has a same value, or is the same signal, as DRVH. In other examples, the PWM signal has any other suitable value based on DRVH and/or DRVL. DRVH and DRVL are determined as a function of various signals, including a control signal (TRIG) provided by the loop control circuit 118 and a control signal (TIME) provided by the on-time timer circuit 120. In an example, the DRVH is asserted responsive to a rising edge occurring in TRIG, controlling the transistor 108 to turn on. Correspondingly, DRVH is deasserted responsive to a rising edge occurring in TIME. In an example, DRVH has an inverse value of DRVL and vice versa. In other examples, an offset may exist between a falling edge of DRVL and a corresponding rising edge of DRVH, and vice versa, such as based on a load placed on the power converter 102. In some examples, the driver 106 buffers and/or amplifies DRVH and DRVL to drive the gates of the transistor 108 and the transistor 110, respectively.

The summing comparator 134 compares a signal provided by the amplifier 128 with a bias voltage VBIAS, VFB with VREF, and a ramp positive (CSP) signal and a ramp negative (CSN) signal provided by the constant amplitude ramp generator 124 to provide TRIG. In an example, the summing comparator 134 provides TRIG having a rising edge responsive to VFB+VCSP decreasing in value to be less than VREF+VCSN. In an example, the loop control circuit 118 accounts for variations in load current drawn from the power converter 102, where CSP and CSN together emulate the ripple of the load current (e.g., CSP minus CSN approximately equals an estimate of ripple of the load current). In operation, the loop control circuit 118 uses CSP and CSN as a ripple injection to adjust VFB, generating a frequency response zero to compensate for a frequency response double pole caused by the inductor 112 and capacitor 114.

In an example, the constant amplitude ramp generator 124 provides a ramp signal having an amplitude that is constant for a given value of VIN and VOUT. The amplitude of the ramp signal may be determined as the difference in value between CSP and CSN. The constant amplitude ramp generator 124 provides the ramp signal based on PWM and an output signal of the input voltage feedforward circuit 126. The output signal of the input voltage feedforward circuit 126, in an example, is a scaled representation of VIN such that CSP and CSN scale proportional to changes in value of VIN. Determination of the ramp signal is described below with respect to the following figures.

Figure 2:
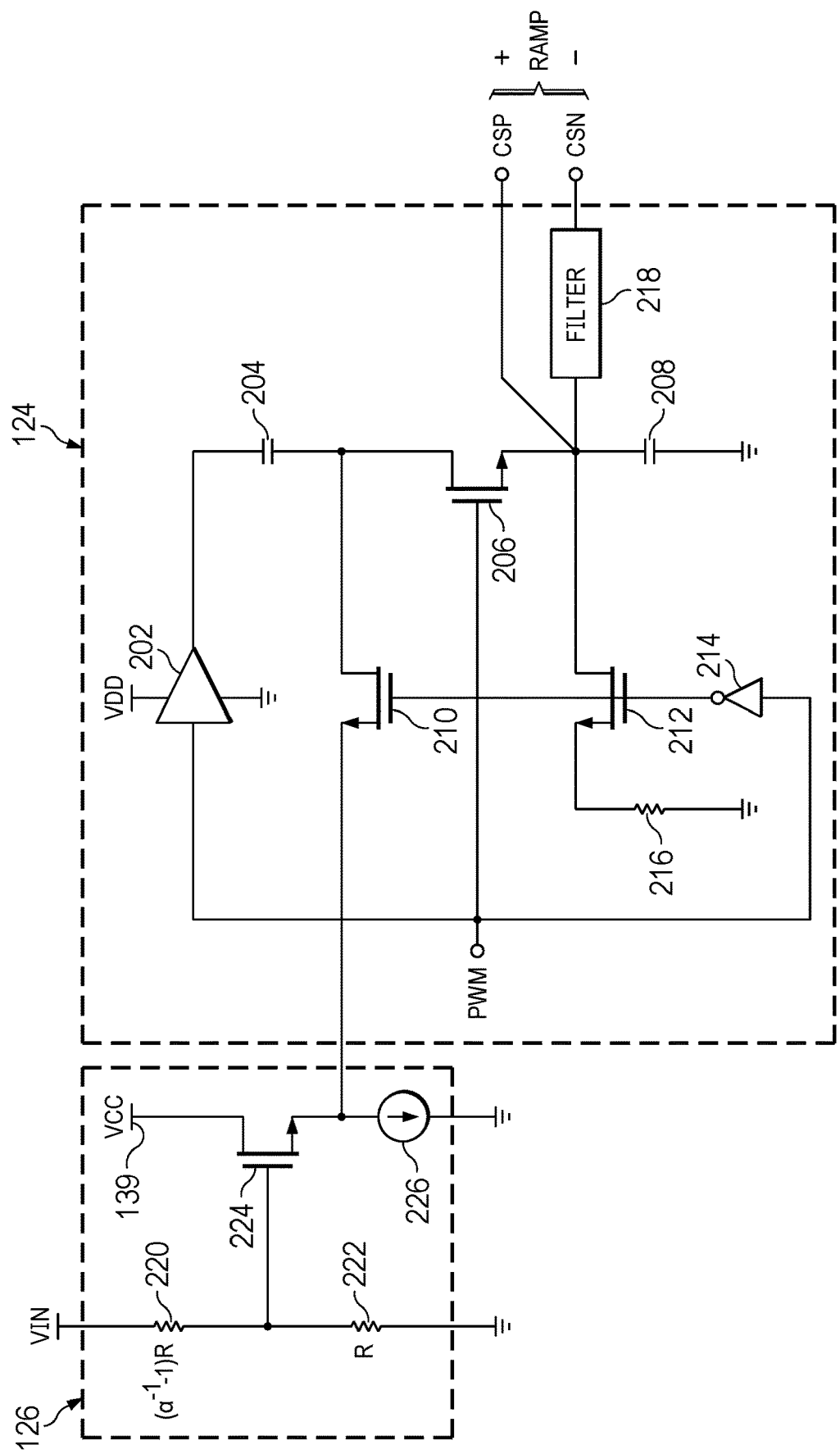
FIG. 2 is a schematic diagram of a constant amplitude ramp generator with an input voltage feedforward circuit, in accordance with various examples.

FIG. 2 is schematic diagram of the constant amplitude ramp generator 124 with the input voltage feedforward circuit 126, in accordance with various examples. In an example, the constant amplitude ramp generator 124 includes a buffer 202, a capacitor 204 having capacitance C204, a transistor 206, a capacitor 208 having capacitance C208, a transistor 210, a transistor 212, an inverter 214, a resistor 216 having resistance R216, and a filter 218. The input voltage feed-forward circuit 126 includes a resistor 220, a resistor 222, a transistor 224, and a current source 226. As shown in FIG. 2, the transistor 224 is in a source-follower arrangement such that the transistor 224 functions as a buffer having an input at the gate of the transistor 224 and an output at the source of the transistor 224. In other examples, the transistor 224 may be omitted and replaced by a suitable buffer of another architecture. For example, an operational amplifier in a unity gain arrangement may be implemented in place of the transistor 224 and the current source 226 to function as a buffer.

In an example architecture, the buffer 202 may be a digital buffer having an input and an output. The capacitor 204 is coupled between the output of the buffer 202 and a drain of the transistor 206. The transistor 206 also has a gate coupled to the input of the buffer 202, and a source. In an example, the transistor 206 receives PWM, as described above herein, at its gate. The capacitor 208 is coupled between the source of the transistor 206 and the ground terminal. The transistor 210 has a gate, a drain coupled to the drain of the transistor 206, and a source. The transistor 212 has a drain coupled to the source of the transistor 206, a source coupled to the ground terminal through the resistor 216, and a gate. The inverter 214 has an input coupled to the gate of the transistor 206, and an output coupled to the gate of the transistor 210 and the gate of the transistor 212. The filter 218 has an input coupled to the source of the transistor 206 and an output. The filter 218 may be of any suitable order, such that the filter 218 may include multiple stages (e.g., multiple serially coupled or cascaded resistor-capacitor filters), the scope of which is not limited herein. In an example, CSP is provided at the source of the transistor 206 and CSN is provided at the output of the filter 218.

The resistor 220 is coupled between the voltage supply 136 and a gate of the transistor 224, and the resistor 222 is coupled between the gate of the transistor 224 and the ground terminal. In this way, the resistor 220 and the resistor 222 form a voltage divider, or voltage scaling circuit, between the voltage supply 136 and the ground terminal, having an output coupled to the gate of the transistor 224. The transistor 224 has a drain coupled to a voltage supply 139 to receive a voltage VCC, and a source coupled to the source of the transistor 210. In some examples, VCC has a value less than VIN. In other examples, VCC has a value approximately equal to VIN, such that the voltage supply 139 is the same as the voltage supply 136. The current source 226 is coupled between the source of the transistor 224 and the ground terminal.

In an example of operation, the capacitor 204 and the capacitor 208 form a switched capacitor circuit or array through the transistor 206, such as to control an amplitude of the ramp signal provided by the constant amplitude ramp generator 124. The constant amplitude ramp generator 124 may be considered to operate in two states—a first state while PWM has an asserted or "high" value and a second state while PWM has a deasserted or "low" value. In the first state, the transistor 206 is turned on and the buffer 202 provides a signal having a high value, that is approximately equal to a supply voltage VDD. In this state, buffer 202 functions as a charge source and provides a voltage approximately equal in value to VDD across the capacitor divider formed by the capacitor 204 and the capacitor 208. During the first state, the transistors 210, 212 may each be turned off. In some examples, VDD has a value less than VIN. In other examples, VDD has a value approximately equal to VIN.

In the second state, the transistor 206 is turned off and the transistors 210, 212 are turned on. The buffer 202 couples its output to the ground terminal responsive to PWM having a deasserted value. In this state, the capacitor 204 is biased or pre-charged by the input voltage feed-forward circuit 126 through the transistor 210 to a voltage provided by the input voltage feed-forward circuit 126, which is approximately equal to αVIN, where α has a value less than 1. For example, the resistor 222 has a resistance of R and the resistor 220 has a resistance of $(\alpha^{-1}-1)R$, providing a signal at the gate of the transistor 224 having a value of approximately αVIN. In some examples, the resistor 220 is implemented having an architecture that facilitates modification of the resistance, such as via control of switches (not shown) or via a control signal provided to the resistor 220. As described above, the transistor 224 is arranged in a source-follower arrangement, such that the transistor 224 provides a signal at its source terminal that also has a value of approximately αVIN. In this way, the transistor 224 may function as a buffer, causing the capacitor 204 to be biased based on VIN. In an example, such biasing causes the amplitude of the ramp signal provided by the constant amplitude ramp generator 124 to compensate for variation in VIN. The compensation for variation in VIN, in at least some examples, reduces a common mode voltage of the ramp signal, easing design and operational constraints on the summing comparator 134 (or another component that receives CSP and CSN). Also in the second state, the capacitor 208 is discharged through the transistor 212 and resistor 216 to provide CSP at the source of the transistor 206. CSP is filtered by the filter 218 to provide CSN at the output of the filter 218. In an example, the ratio of C204 and C208 control the height, or amplitude, of the ramp signal (e.g., CSP-CSN), which remains constant with duty cycle. Accordingly, the amplitude of the ramp signal may be determined according to the following equation 1, in which D is the duty cycle of PWM and F is the frequency of PWM.

$$\frac{VDD + \alpha VIN}{\frac{C208 + C204}{C204} + \frac{R216 * C208 * F}{1 - D}} \quad (1)$$

Figure 3:
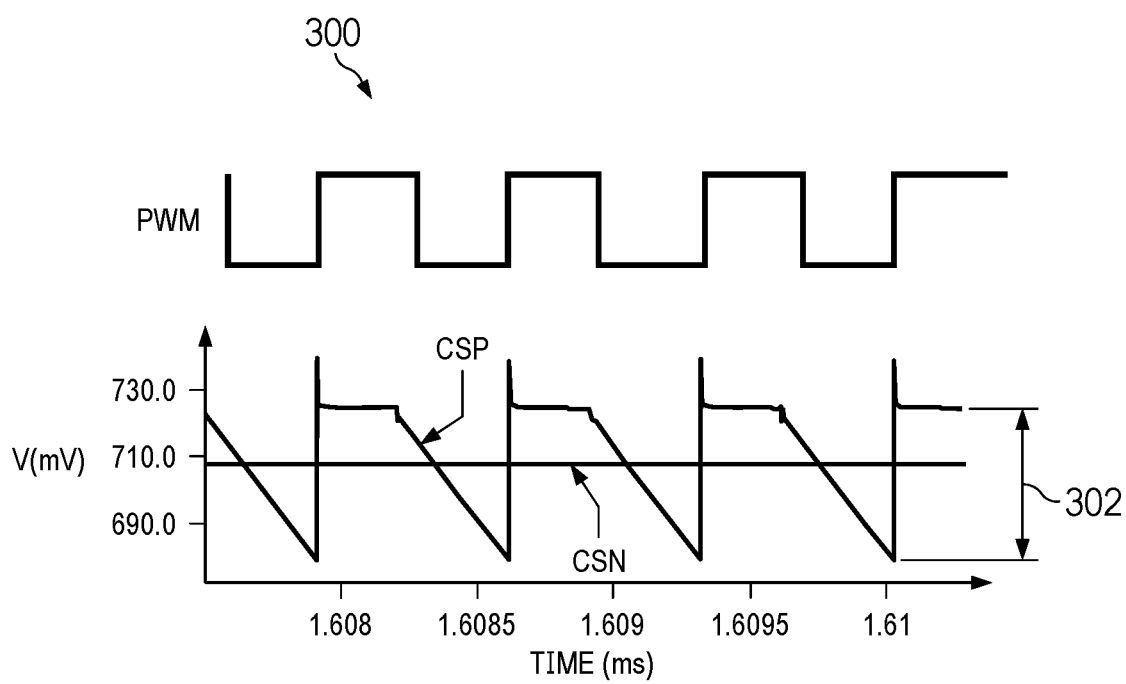
FIG. 3 is a timing diagram of signals of a constant amplitude ramp generator with an input voltage feedforward circuit, in accordance with various examples.

FIG. 3 is a timing diagram 300 of signals of the constant amplitude ramp generator 124 with the input voltage feed-forward circuit 126, in accordance with various examples. The diagram 300 includes PWM, CSP, and CSN, each as described above herein. CSP and CSN are shown on a horizontal axis representative of time in units of milliseconds (ms) and vertical axis representative of voltage in units of millivolts (mV). While the diagram 300 is shown with particular voltage and time values for the sake of understanding, these values are merely examples and are not limiting.

As shown in the diagram 300, responsive to PWM having an asserted (e.g., high) value, CSP maintains a steady-state value resulting from capacitive division between the capacitor 204 and the capacitor 208. Responsive to a falling edge in PWM to cause PWM to have a deasserted value, CSP discharges through the transistor 212 and resistor 216. As further shown in FIG. 3, CSN maintains a substantially unchanged value as a result of its filtering (e.g., such that CSN represents a direct current (DC) component of CSP). The amplitude indicated by 302 is the amplitude of the ramp signal, having a value as defined above in equation 1. Accordingly, as VIN increases, the amplitude indicated by 302 will also increase, and as VIN decreases, the amplitude indicated by 302 will also decrease.

Figure 4:
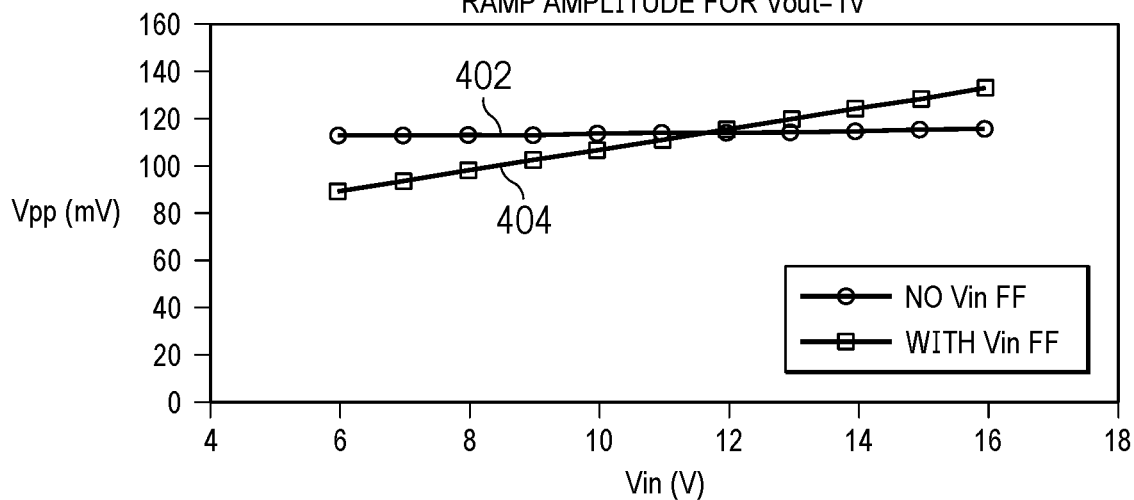
FIG. 4 is a diagram of signals, in accordance with various examples.

FIG. 4 is a diagram 400 of signals, in accordance with various examples. The diagram 400 includes a signals 402, 404. The signals 402, 404 are representative of ramp signals that may be provided by the constant amplitude ramp generator 124 in the absence and presence of the input voltage feed-forward circuit 126, respectively, for a VOUT value of 1 volt (V). The signals 402, 404 are shown having a horizontal axis representative of VIN in units of V and a vertical axis representative of a peak-to-peak voltage (Vpp) in units of millivolts (mV). As shown by the diagram 400, the amplitude of the signal 404 scales approximately linearly with changes to VIN for low duty cycle applications.

Figure 5:
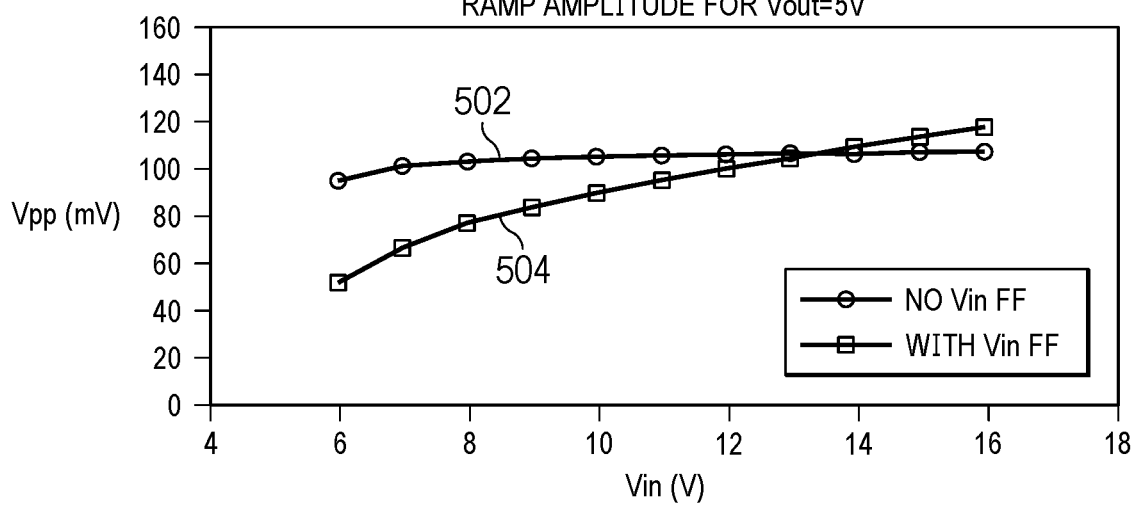
FIG. 5 is a diagram of signals, in accordance with various examples.

FIG. 5 is a diagram 500 of signals, in accordance with various examples. The diagram 500 includes a signals 502, 504. The signals 502, 504 are representative of ramp signals that may be provided by the constant amplitude ramp generator 124 in the absence and presence of the input voltage feed-forward circuit 126, respectively, for a VOUT value of 5 V. The signals 502, 504 are shown having a horizontal axis representative of VIN in units of V and a vertical axis representative of Vpp in units of mV. As shown by the diagram 500, the amplitude of the signal 504 scales with changes to VIN. For example, for high duty cycle application environments, such as while VIN is close in value to VOUT (e.g., within about 5 V of VOUT), substantial reduction is seen in the amplitude of the signal 504 in comparison to the signal 502, resulting from implementation of the input voltage feed-forward circuit 126.

FIG. 6 is a diagram 600 of signals, in accordance with various examples. The diagram 600 includes a signals 602, 604. The signals 602, 604 are representative of a common mode voltage of ramp signals that may be provided by the constant amplitude ramp generator 124 in the absence and presence of the input voltage feed-forward circuit 126, respectively, for a VOUT value of 5 V. The signals 602, 604 are shown having a horizontal axis representative of VIN in units of V and a vertical axis representative of common mode voltage (VCM) in units of V.

As shown by the diagram 600, such as by comparison of the signal 604 to the signal 602, VCM is reduced by reducing the amplitude of the ramp signal for high duty cycle application environments, such as while VIN is close in value to VOUT (e.g., within about 5 V of VOUT). For example, for VIN of 6 V and VOUT of 5V, VCM is reduced by approximately one-half through implementation of the input voltage feed-forward circuit 126, as described herein.

In this description, the term "couple" may cover connections, communications, or signal paths that enable a functional relationship consistent with this description. For example, if device A provides a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal provided by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. An apparatus, comprising:
   a constant amplitude ramp generator having a differential output and first and second generator inputs, in which the first generator input is coupled to a power terminal; and
   an input voltage feed-forward circuit having a feed-forward input and a feed-forward output, in which the feed-forward input is coupled to an input voltage terminal, and the feed-forward output is coupled to the second generator input.

2. The apparatus of claim 1, further comprising a power converter, in which the power terminal is a switch terminal of the power converter, the power converter is coupled to the input voltage terminal, and the power converter is configured to switch power from the input voltage terminal to an output voltage terminal.

3. The apparatus of claim 2, wherein the power converter is switched based on a differential signal provided at the differential output.

4. The apparatus of claim 1, wherein the input voltage feed-forward circuit includes:
   a voltage divider having a divider output, in which the voltage divider is coupled between the input voltage terminal and a ground terminal, and the divider output is coupled to the second generator input; and
   a buffer having a buffer input, a buffer output, and a buffer supply input, wherein the buffer input is coupled to the divider output, and the buffer supply input is coupled to a voltage supply terminal.

5. The apparatus of claim 4, wherein the constant amplitude ramp generator includes:
   a second buffer having a second buffer input and a second buffer output, in which the second buffer input is the first generator input coupled to the power terminal;
   a first transistor having a first control terminal;
   a first capacitor coupled between the second buffer output and the first transistor, in which the first transistor is coupled between the first capacitor and the buffer output;
   a second transistor having a second control terminal, in which the second transistor is coupled between the first capacitor and a first output terminal, and the second control terminal is coupled to the power terminal;
   a third transistor having a third control terminal;
   an inverter having an inverter input and an inverter output, the inverter input coupled to the power terminal, and the inverter output coupled to the first and third control terminals;
   a resistor coupled between the ground terminal and the third transistor, in which the third transistor is coupled between the first output terminal and the resistor;
   a second capacitor coupled between the first output terminal and the ground terminal; and
   a filter coupled between the first output terminal and a second output terminal.

6. The apparatus of claim 1, wherein the input voltage feed-forward circuit is configured to bias the constant amplitude ramp generator based on an input voltage provided at the input voltage terminal.

7. The apparatus of claim 6, wherein the input voltage feed-forward circuit includes:
   a transistor configured in a source-follower arrangement, the transistor having a control terminal, a source, and a drain, wherein the control terminal is coupled to the divider output, and the drain is coupled to a voltage supply terminal; and
   a current source coupled between the source and a ground terminal.

8. The apparatus of claim 7, wherein the transistor injects a bias voltage to the constant amplitude ramp generator, the bias voltage including a voltage proportional to the input voltage.

9. The apparatus of claim 8, wherein the input voltage feed-forward circuit includes a voltage scaling circuit configured to scale the input voltage to provide the voltage proportional to the input voltage.

10. The apparatus of claim 9, wherein the voltage scaling circuit is a voltage divider.

11. An apparatus, comprising:
    a voltage divider having a divider output, in which the voltage divider is coupled between an input voltage terminal and a ground terminal;
    a first transistor having a first control terminal, a source, and a drain, in which the first control terminal is coupled to the divider output, and the drain is coupled to a voltage supply terminal;
    a current source coupled between the source and the ground terminal;
    a buffer having a buffer input and a buffer output, the buffer input coupled to a signal input terminal;
    a second transistor having a second control terminal;
    a first capacitor coupled between the buffer output and the second transistor, in which the second transistor is coupled between the first capacitor and the source;
    a third transistor having a third control terminal, in which the third transistor is coupled between the first capacitor and a first output terminal, and the third control terminal is coupled to the signal input terminal;
    a fourth transistor having a fourth control terminal;
    an inverter having an inverter input and an inverter output, the inverter input coupled to the signal input terminal, and the inverter output coupled to the second and fourth control terminals;
    a resistor coupled between the ground terminal and the fourth transistor, in which the fourth transistor is coupled between the first output terminal and the resistor;
    a second capacitor coupled between the first output terminal and the ground terminal; and
    a filter coupled between the first output terminal and a second output terminal.

12. The apparatus of claim 11, wherein the first output terminal and the second output terminal form a differential output.

13. The apparatus of claim 11, wherein the filter is a second order filter.

14. The apparatus of claim 11, wherein the second control terminal is coupled to receive a drive signal of a power converter that switches a voltage provided at the input voltage terminal to provide an output voltage.

15. A system, comprising:
a power converter including a switch terminal and a control terminal, the power converter configured to switch a signal from an input voltage terminal to an output voltage terminal; and
a controller coupled to the power converter, the controller configured to control the power converter to switch the signal from the input voltage terminal to the output voltage terminal, in which the controller includes:
a ramp generator having a first and second generator inputs and a differential output;
an input voltage feed-forward circuit having a feed-forward input and a feed-forward output, in which the feed-forward input is coupled to the input voltage terminal, and the feed-forward output is coupled to the second generator input; and
control logic coupled to the ramp generator, the differential output, and the control terminal, the control logic configured to determine a value of a control signal for controlling the power converter based on a differential signal provided at the differential output.

16. The system of claim 15, wherein the input voltage feed-forward circuit includes:
a voltage divider having a divider output, in which the voltage divider is coupled between the input voltage terminal and a ground terminal, and the divider output is coupled to the second generator input;
a first transistor having a first control terminal, a source, and a drain, in which the first control terminal is coupled to the divider output, and the drain is coupled to a voltage supply terminal; and
a current source coupled between the source and the ground terminal.

17. The system of claim 16, wherein the ramp generator includes:
a buffer having a buffer input and a buffer output, in which the buffer input is the first generator input coupled to the control logic;
a second transistor having a second control terminal;
a first capacitor coupled between the buffer output and the second transistor, in which the second transistor is coupled between the first capacitor and the source;
a third transistor having a third control terminal, in which the third transistor is coupled between the first capacitor and a first output terminal, and the third control terminal is coupled to the control logic;
a fourth transistor having a fourth control terminal;
an inverter having an inverter input and an inverter output, the inverter input coupled to the control logic, and the inverter output coupled to the second and fourth control terminals;
a resistor coupled between the ground terminal and the fourth transistor, in which the fourth transistor is coupled between the first output terminal and the resistor;
a second capacitor coupled between the first output terminal and the ground terminal; and
a filter coupled between the first output terminal and a second output terminal.

18. The system of claim 17, wherein the filter is a first filter, and the ramp generator includes a second filter coupled in series between the first filter and the second output terminal.

19. The system of claim 17, wherein the control logic includes a summing comparator configured to determine the value of the control signal based on the differential signal, a feedback signal of the power converter, a reference voltage, and a bias voltage.

20. The system of claim 17, wherein the first transistor injects a bias voltage to the ramp generator at the second transistor, the bias voltage including a supply voltage from the supply voltage terminal and a voltage proportional to the signal at the input voltage terminal.

* * * * *